(12) United States Patent
Morikawa et al.

(10) Patent No.: US 9,866,008 B2
(45) Date of Patent: Jan. 9, 2018

(54) APPARATUS FOR CONTROLLING POWER SOURCE

(71) Applicant: OMRON Corporation, Kyoto-shi (JP)

(72) Inventors: Akihiko Morikawa, Kyoto (JP); Takao Ushiyama, Ritto (JP); Junichi Ueno, Otsu (JP); Toshinori Sato, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 684 days.

(21) Appl. No.: 13/777,336

(22) Filed: Feb. 26, 2013

(65) Prior Publication Data

US 2013/0241316 A1   Sep. 19, 2013

(30) Foreign Application Priority Data

Mar. 15, 2012   (JP) ................................. 2012-058278

(51) Int. Cl.
  *G05B 19/4061*   (2006.01)
  *H02H 1/00*   (2006.01)

(52) U.S. Cl.
  CPC ....... *H02H 1/0007* (2013.01); *G05B 19/4061* (2013.01); *G05B 2219/39083* (2013.01); *G05B 2219/49138* (2013.01)

(58) Field of Classification Search
  CPC ...... G05B 19/4061; G05B 2219/49138; G05B 2219/39083; H02H 1/0007
  USPC ......................................................... 307/326
  See application file for complete search history.

(56) References Cited

U.S. PATENT DOCUMENTS

| | | | |
|---|---|---|---|
| 6,208,105 B1 * | 3/2001 | Kato et al. ................ | 318/568.24 |
| 2003/0037977 A1 * | 2/2003 | Tatara ...................... | B60K 6/52 |
| | | | 180/65.25 |
| 2006/0108960 A1 * | 5/2006 | Tanaka et al. ........... | 318/568.21 |
| 2008/0046122 A1 * | 2/2008 | Manzo et al. ................ | 700/245 |
| 2009/0024142 A1 * | 1/2009 | Ruiz Morales ............... | 606/130 |
| 2009/0030549 A1 * | 1/2009 | Sakai et al. .................. | 700/245 |
| 2009/0192710 A1 * | 7/2009 | Eidehall et al. .............. | 701/301 |
| 2010/0087948 A1 * | 4/2010 | Yamaguchi ................... | 700/178 |

(Continued)

FOREIGN PATENT DOCUMENTS

| | | |
|---|---|---|
| DE | 10324627 A1 | 1/2005 |
| EP | 1892456 A1 | 2/2008 |

(Continued)

*Primary Examiner* — Rexford Barnie
*Assistant Examiner* — Thai Tran
(74) *Attorney, Agent, or Firm* — Metrolexis Law Group, PLLC

(57) ABSTRACT

A safety unit is provided for this purpose, and includes a position determining unit, a speed determining unit, a logical product unit, and a stopping unit. When a rotation amount (positional data) of an encoder rotating in connection with a rotation shaft of a servo motor falls within a predetermined limiting range, the position determining unit outputs a command for stopping a motor to a logical product unit. When rotation speed of the encoder rotating in connection with the rotation shaft of the servo motor falls within a predetermined limiting range, the speed determining unit outputs the command for stopping the motor to the logical product unit. This control by the logical product unit requires a stop command from both the position and speed determining units. The logical product unit informs the stopping unit to stop the servo motor to a controller.

19 Claims, 13 Drawing Sheets

(56) References Cited

U.S. PATENT DOCUMENTS

| | | | |
|---|---|---|---|
| 2010/0125361 A1* | 5/2010 | Mougin et al. | 700/217 |
| 2010/0193668 A1* | 8/2010 | Kawabata | 250/214 SW |
| 2010/0292843 A1* | 11/2010 | Kariyazaki et al. | 700/264 |
| 2011/0241447 A1* | 10/2011 | Ando et al. | 307/326 |

FOREIGN PATENT DOCUMENTS

| | | |
|---|---|---|
| EP | 1901151 A1 | 3/2008 |
| JP | S58-160092 A | 9/1983 |
| JP | H02-221526 A | 9/1990 |
| JP | H09-195321 A | 7/1997 |
| JP | H11-212650 A | 8/1999 |
| JP | 2005-25479 A | 1/2005 |
| JP | 2008-117197 A | 5/2008 |

* cited by examiner

APPARATUS FOR CONTROLLING POWER SOURCE

CROSS REFERENCE TO RELATED APPLICATIONS

This application claims priority based on 35USC119 from prior Japanese Patent Application No. P2012-058278 filed on Mar. 15, 2012, entitled "APPARATUS FOR CONTROLLING POWER SOURCE", the entire contents of which are incorporated herein by reference.

TECHNICAL FIELD

The present invention relates to an apparatus for controlling a power source, and particularly to a technology that limits operation of a power source when a predetermined condition is met.

RELATED ART

In a mechanical apparatus used in industry, for example, international standards are stipulated, such as IEC61508 (Functional Safety of Electrical/Electronic/Programmable Electronic Safety-related Systems) and IEC61800-5-2 (Functional Safety of Adjustable Speed Electrical Power Drive Systems). These standards, for example, stipulate that a power source should stop when an operator approaches a predetermined region for operator safety. As one example of imposing the limitation to the operation like this, the case in the related art is enumerated in which the power source is stopped whenever it is necessary. Examples include detection of an operator's approach using an input device such as a safety switch and a safety light curtain, or from monitoring speed of a drive unit of the power source by, for example, a safety speed sensor.

However, although a situation occurs in which an amount of safety monitoring from a certain safety sensor may exceed a threshold value, in various operational states of a machine, the operator's safety can be ensured without stopping the power source. Therefore, there is also a need not to limit the operation of the power source wastefully. One way that meets this need is to temporarily mute a specific safety sensor, as disclosed in JP 2005-25479 A.

Muting a safety sensor only affects safety monitoring from that specific sensor. Therefore, when the amount of safety monitoring from another safety sensor that is not disregarded exceeds the threshold value, operation of the power source has to be stopped in the same manner. For example, even though a safety sensor, which detects a rotation speed of a drive shaft of the power source, is disregarded, operation of the power source may be stopped when a rotation angle of the drive shaft exceeds a predetermined threshold. However, even though the rotation angle of the drive shaft exceeds the predetermined threshold value, operator safety may be ensured without stopping the power source, depending on the rotation speed of the drive shaft of the power source. In this manner, since there are various situations in which the safety of the operator can be ensured, even though the specific safety sensor is simply disregarded, the limitation to the operation of the power source may not be canceled in such various situations. Therefore, in the situation where the operator's safety can be ensured without stopping the power source, the power source would be stopped wastefully.

SUMMARY

The invention described herein surprisingly alleviates the problems described above, and an object thereof is to cancel limitation to operation of a power source in various situations.

In accordance with one aspect of embodiments, there is provided an apparatus for controlling a power source including a detecting unit that detects at least two physical parameters among a plurality of physical parameters of a power body driven by the power source and a plurality of physical parameters of the power source, a safety range setting unit that sets a safety range of the physical parameter, which prevents an operator from coming into contact with the power body, a limiting range setting unit that sets a limiting range of the physical parameter, different from the safety range, a determining unit that determines whether the physical parameter falls within the safety range or within the limiting range, and a limiting unit that limits operation of the power source only in a case where the at least two detected physical parameters fall within the limiting ranges with regard to the at least two physical parameters, respectively.

In accordance with another aspect of embodiments, there is provided an apparatus for controlling a power source including a detecting unit that detects physical parameters of at least two shafts of power bodies driven by at least two of the power sources, a safety range setting unit that sets a safety range of a combination of the physical parameters of the at least two shafts, which prevents an operator from coming into contact with the power bodies, a limiting range setting unit that sets a limiting range of the combination of the physical parameters of the at least two shafts, different from the safety range, a determining unit that determines whether the combination of the physical parameters of the at least two shafts falls within the safety range or within the limiting range, and a limiting unit that limits operations of at least two power sources only in a case where the combination of the physical parameters of the at least two shafts falls within the limiting range.

In accordance with still another aspect, there is provided an apparatus for controlling a power source including a detecting unit that detects physical parameters of at least two shafts of drive units of at least two of the power sources that drive power bodies, a safety range setting unit that sets a safety range of a combination of the physical parameters of the at least two shafts, which prevents an operator from coming into contact with the power body, a limiting range setting unit that sets a limiting range of the combination of the physical parameters of the at least two shafts, different from the safety range, a determining unit that determines whether the combination of the physical parameters of the at least two shafts falls within the safety range or within the limiting range, and a limiting unit that limits operations of the at least two power sources only in a case where the combination of the physical parameters of the at least two shafts falls within the limiting range.

As one example, when both position and speed of the power body meet their respective predetermined conditions, operation of the power source may be limited. On the other hand, when the speed of the power body does not meet its predetermined condition even though the position of the power body meets its predetermined condition, the operation of the power source may not be limited. As another example, when all of the positions of the drive units of the two or more power sources meet their respective predetermined conditions, the operation of the power source may be limited. On the other hand, even when the position of the drive unit of one power source meets the predetermined condition and the position of the drive unit of the other power source does not meet the predetermined condition, the operation of the power sources may not be limited. In these examples, the limitation to the operation of the power source in the various situations may be canceled by not imposing the limitation to the operation of the power source when the multiple predetermined conditions are not met simultaneously. Therefore, the limitation to the operation of the power source in various situations may be canceled.

DETAILED DESCRIPTION

Figure 1:
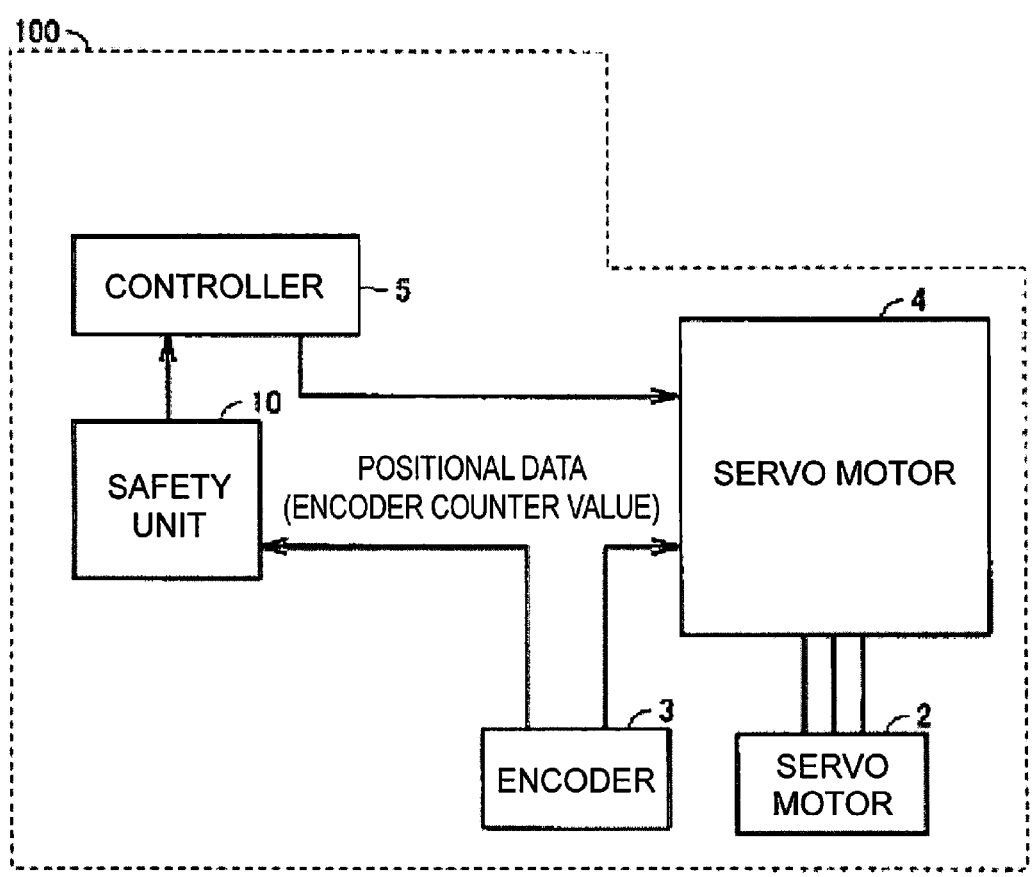
FIG. 1 is a schematic configuration diagram illustrating a servo system according to one embodiment of the invention.

An embodiment according to the invention is described below in detail, referring to the drawings. In addition, like reference numerals are given the same or equivalent parts and their descriptions are not repeated.

First Embodiment

FIG. 1 is a schematic configuration diagram illustrating a servo system according to an embodiment. Referring to FIG. 1, servo system 100 is used as a system for driving a variety of mechanical apparatuses (for example, an arm of an industrial robot) not shown. Servo system 100 includes servo motor 2, encoder 3, servo driver 4, controller 5, and safety unit 10.

Servo motor 2, for example, is an AC servo motor. Encoder 3 is attached directly to servo motor 2 to detect operation of servo motor 2, or is attached to a power body to detect operation of the power body driven by servo motor 2. Generally, an amount of encoder rotation is prescribed as an encoder counter value, and the encoder counter value is obtained by multiplying a count per one rotation of the encoder by the number (including also a decimal) of times the encoder rotates. Encoder 3 transmits the encoder counter value, as positional data, to servo driver 4 and safety unit 10. Therefore, servo driver 4 and safety unit 10 may obtain positional information of the power body driven by servo motor 2 via acquiring the positional data (the encoder counter value) from the encoder. In addition, a general incremental type encoder or an absolute type encoder may be used as encoder 3.

Servo driver 4 receives a command signal from controller 5 and receives the encoder count value output from encoder 3. Servo driver 4 drives servo motor 2, based on the command signal from controller 5, and the encoder counter value from encoder 3.

Based on a command from controller 5, servo driver 4 controls electric power and/or frequency that are supplied to servo motor 2, in such a manner that the operation of servo motor 2 complies with a command value from controller 5.

Controller 5, for example, is a programmable controller (PLC), a position control unit, or the like, and sends an operational command signal of servo motor 2 to perform positioning control, speed control, torque control, and the like.

Safety unit 10 monitors operation (position, speed, torque and others) of servo motor 2 and/or of a mechanical component driven by servo motor 2, based on the encoder counter value from encoder 3, and at the same time, generates a stop signal to stop servo motor 2 and transmits the stop signal to controller 5, when the operation of the monitored mechanical component falls within a predetermined range.

Figure 2:
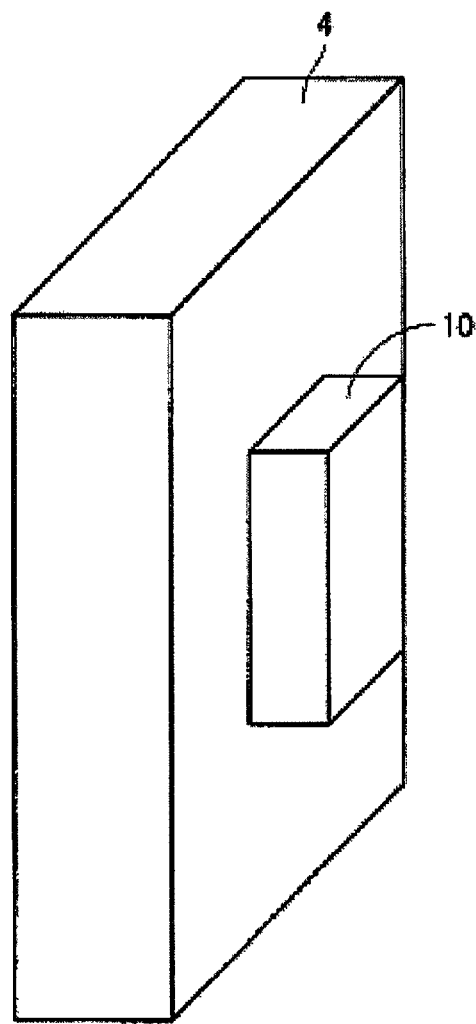
FIG. 2 is a diagram illustrating one example of a servo driver and a safety unit illustrated in FIG. 1.

FIG. 2 is a diagram illustrating one example of servo driver 4 and safety unit 10 illustrated in FIG. 1. Servo driver 4 and safety unit 10 make up a servo motor drive apparatus for driving the servo motor.

Referring to FIG. 2, according to the first embodiment, servo driver 4 and safety unit 10 are realized as individual devices, respectively. Although not illustrated, safety unit 10 is connected to servo driver 4, for example, via a connector, a cable, or the like.

Safety unit 10 and servo driver 4 may be integrated into one piece. For example, servo driver 4 and safety unit 10 may be put into one casing.

Figure 3:
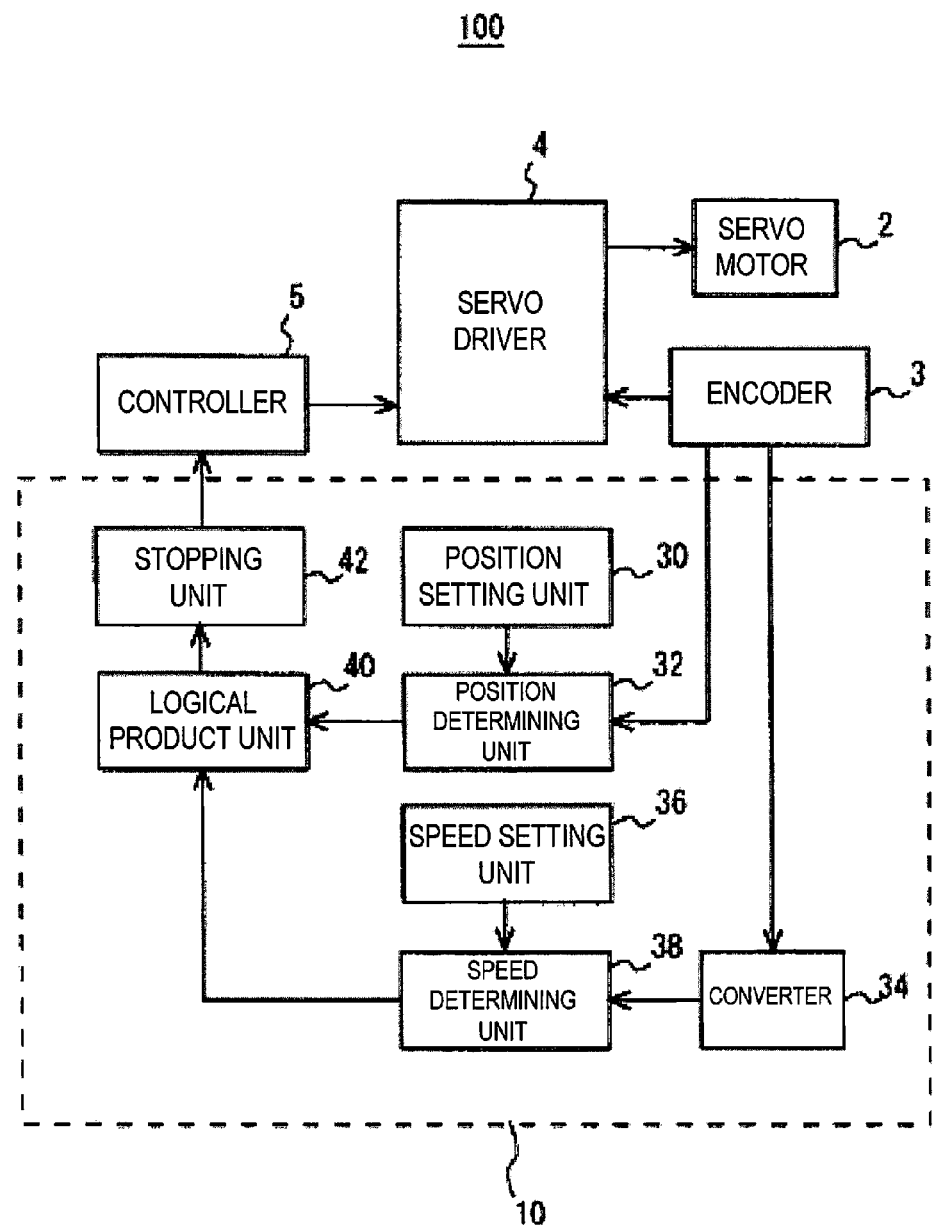
FIG. 3 is a functional block diagram of a safety unit according to a first embodiment.

FIG. 3 is a functional block diagram for describing a configuration of safety unit 10 illustrated in FIG. 1. Safety unit 10 includes position setting unit 30, position determining unit 32, converter 34, speed setting unit 36, speed determining unit 38, logical product unit 40, and stopping unit 42.

Position setting unit 30 sets a safety range and a limiting range of a position of servo motor 2 or of the power body driven by servo motor 2 in advance. To sum up, a range of the position of the power body is set by setting the encoder counter value of encoder 3 in position setting unit 30 based on a user's operation.

The safety range means a range in which an operator does not come into contact with a controlled power body such as a robot arm. Furthermore, the limiting range is determined differently from the safety range. The safety range and the limiting range are prescribed in the form of a table, and the table is stored in safety unit 10.

Position determining unit 32 determines whether the position of servo motor 2 or of the power body driven by servo motor 2 falls within the safety range or within the limiting range in which the safety range and the limiting range are determined by position setting unit 30. When the condition is met in which the position of the power body has to fall within the limiting range determined by position setting unit 30, position determining unit 32 outputs a motor stop command to logical product unit 40.

Converter 34 computes the speed of the power body, for example, by differentiating the positional data from encoder 3. That is, converter 34 converts the position into the speed.

Speed setting unit 36 sets in advance the safety range and the limiting range with regard to the speed of the power body, based on the user's operation.

Speed determining unit 38 determines whether the speed of the power body falls within the safety range or within the limiting range, in which the safety range and the limiting range are determined by speed setting unit 36. When the condition is met in which the speed of the power body has to fall within the limiting range determined by speed setting unit 36, speed determining unit 38 outputs a motor stop command to logical product unit 40.

Logical product unit 40 obtains a logical product that derives from both of position determining unit 32 and speed determining unit 38. Accordingly, logical product unit 40 outputs a command for stopping servo motor 2 to stopping unit 42, only when it receives the motor stop command from both of position determining unit 32 and speed determining unit 38.

Stopping unit 42 receives the command from logical product unit 40 and then performs processing for stopping servo motor 2. Accordingly, servo motor 2 that is a power source is stopped, only in a case where both of the condition in which the position of the power body (for example, the position of the industrial robot arm) has to fall within the predetermined limiting range and the condition in which the speed of the power body (for example, the speed of the industrial robot arm) has to fall within the predetermined limiting range are met at the same time. Even though an example in which a stop signal is output to controller 5 is illustrated as an example of processing for stopping servo motor 2 in the drawing, the stop signal may be output to servo driver 4, or electric power supply to servo motor 2 may be cut off using a contactor or the like.

An example in which servo system 100 according to the first embodiment is applied to visual inspection apparatus 200 is described with reference to FIG. 4. Visual inspection apparatus 200 is an apparatus that operator 206 inspects an inspection-needed object (a product) with eyes. Visual inspection apparatus 200 has a construction in which an inspection table 202, on which the inspection-needed object is mounted, is rotated using the servo motor so that both surfaces of the inspection-needed object can be visually inspected without touching the inspection-needed object. When operator 206 operates a jog switch 203, inspection table 202 is rotated at low speed by servo motor 2. The position (the rotation angle) and the rotation speed of the inspection table are detected by encoder 3 connected to a shaft of servo motor 2.

Figure 4:
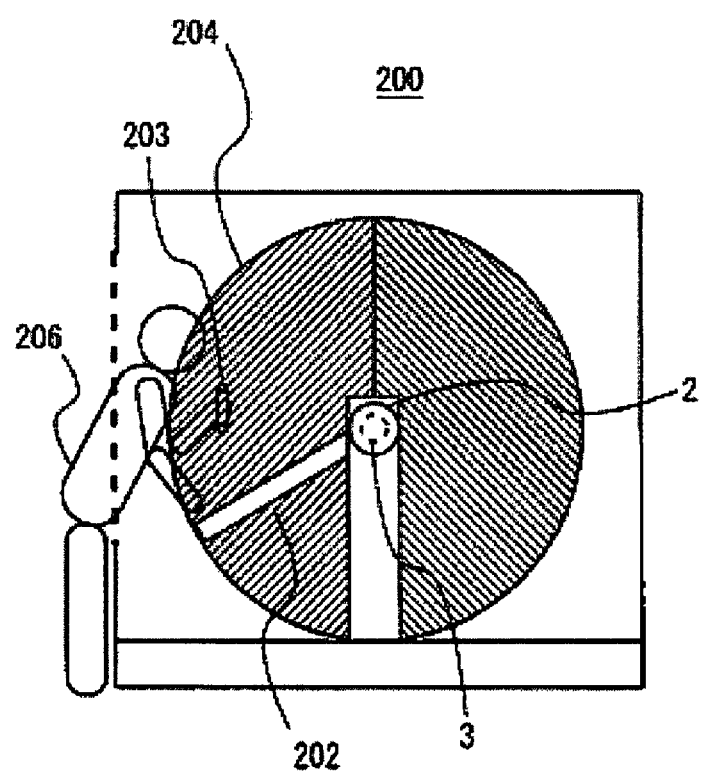
FIG. 4 is a diagram illustrating an example in which the servo system according to the first embodiment is applied to a visual inspection apparatus.

A region indicated by slash lines in FIG. 4 indicates a movable region 204 of inspection table 202. In addition, for the purpose of description, FIG. 4 illustrates that movable region 204 is divided into a right-hand half region and a left-hand half region that are distinguished by different directions of the slash lines.

When inspection table 202 is within a range of the left-hand half of movable region 204 and the speed of inspection table 202 is greater than a setting value in FIG. 4, operator 206 and inspection table 202 come into contact with each other and this may cause damage to the inspection-needed object.

On the other hand, regardless of the speed of inspection table 202, operator 206 and inspection table 202 may not come into contact with each other because when inspection table 202 is within a range of the right-hand half of the movable region 204, inspection table 202 and operator 206 are separated from each other.

Furthermore, when the speed of inspection table 202 is lower than the set value, operator 206 and inspection table 202 may not contact each other even though the inspection table is within the range of the left-hand half of movable region 204 because the motion speed of the inspection table is low.

Accordingly, in the example illustrated in FIG. 4, if the operation of servo motor 2 is limited on the assumption that inspection table 202 is within the range of the left-hand half of movable region 204 and inspection table 202 overspeeds, this is enough to prevent operator 206 and inspection table 202 from contacting each other. Under other situations, the operation may not be limited regardless of the position and the speed.

As described above, according to the present embodiment, when both position and speed of the power body meet their respective predetermined conditions, power source operation is limited and thus is stopped. On the other hand, when the speed of the power body does not meet its predetermined condition even though the position of the power body meets its predetermined condition, the operation of the power source may not be limited. That is, according to the present embodiment, even though the stopping of the power body is thought of as preferable when only the position is taken into consideration, the operation of servo motor 2 as the power source may not be limited in a case where safety of the operator is able to be secured without stopping the power body when the speed, different from the position in terms of a kind of physical parameter, is also taken into consideration. Conversely, even though the stopping of the power body is thought of as preferable when only the speed is taken into consideration, the operation of servo motor 2 as the power source may not be limited in a case where safety of the operator is able to be secured also without stopping the power body when the position, different from the speed in terms of a kind of physical parameter, is also taken into consideration. In this manner, limitation to the operation of the power source may be set in various situations, without imposing the limitation to the operation of the power source in a case where the multiple predetermined conditions are met simultaneously.

Furthermore, unlike in the related art, it is not necessary to separately provide a switch for muting a specific sensor because the setting may be performed in such a manner that the operation of the power source is not limited even though the power body is in whatever position at a specific speed, or conversely, in such a manner that the operation of the power source is not limited even though the power body is in a specific position at whatever speed. That is, the muting of the specific sensor is substantially automatically performed. Therefore, a program and/or a configuration that are necessary for introduction of the switch for muting the sensor may be saved and a mechanical apparatus may be simplified.

Second Embodiment

A second embodiment is described below. This embodiment differs from the first embodiment in that a motion direction is also monitored in addition to the position and the speed. Other configurations are the same as in the first embodiment described above. Accordingly, their detailed descriptions are not repeated here.

Figure 5:
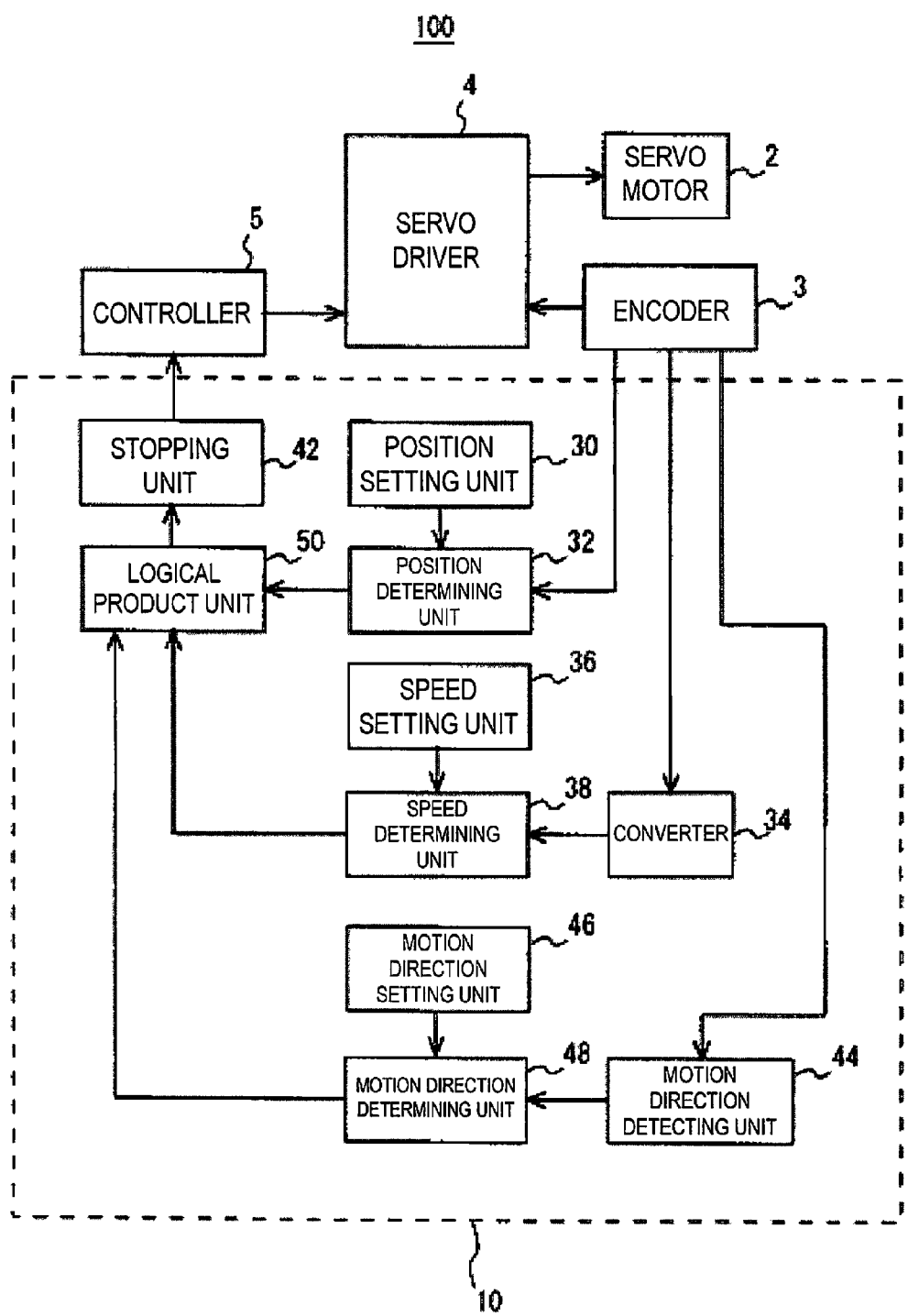
FIG. 5 is a functional block diagram of a safety unit according to a second embodiment.

Referring to FIG. 5, a configuration of a safety unit 10 according to the present embodiment is described. The same configurations as in the first embodiment described above are given like reference numerals and their detailed descriptions are not repeated here.

Safety unit 10 further includes motion direction detecting unit 44, motion direction setting unit 46, and a motion direction determining unit 48. Motion direction detecting unit 44 detects a motion direction of a power body (a rotation direction of a servo motor 2), based on positional data from an encoder 3.

A safety direction and a limiting direction of the motion of the power body are set in advance in motion direction setting unit 46, based on the user's operation. The term "safety direction range" means a range of directions that prevents an operator from coming into contact with the power body such as a robot arm. Furthermore, the limiting direction is determined in such a manner as to differ from the safety direction. The safety direction and the limiting direction are prescribed in the form of a table, and the table is stored in safety unit 10.

Motion direction determining unit 48 determines whether the motion direction of the power body is the safety direction or the limiting direction in which the safety direction and the limiting direction are set by motion direction setting unit 46. When a condition is met in which the motion direction of the power body has to be the limiting direction, set by motion direction setting unit 46, motion direction determining unit 48 outputs a motor stop command to a logical product unit 50.

According to the present embodiment, logical product unit 50 obtains a logical product that derives from motion direction determining unit 48, in addition to deriving from position determining unit 32 and speed determining unit 38. Accordingly, logical product unit 50 outputs a command for stopping servo motor 2 to stopping unit 42, only when it receives a motor stop command from all of position determining unit 32, speed determining unit 38, and motion direction determining unit 48.

Therefore, according to the present embodiment, servo motor 2, which is a power source, is stopped, only in a case where all conditions in which the position of the power body (for example, the position of the robot arm) has to fall within a predetermined limiting range, the condition in which the speed of the power body (for example, the speed of the robot arm) has to fall within a predetermined limiting range, and the condition in which the motion direction of the power body (for example, the motion direction of the robot arm) has to be a predetermined limiting direction are met at the same time.

In addition, logical product unit 50 may obtain the logical product that derives from at least two of position determining unit 32, speed determining unit 38 and motion direction determining unit 48. That is, servo motor 2, which is the power source, may be stopped, only in a case where at least two of the condition in which the position of the power body (for example, the position of the robot arm) has to fall within the predetermined limiting range, the condition in which the speed of the power body (for example, the speed of the robot arm) has to fall within the predetermined limiting range, and the condition in which the motion direction of the power body (for example, the motion direction of the robot arm) has to be the predetermined limiting direction are met at the same time.

Third Embodiment

A third embodiment is described below. The third embodiment is different from the first embodiment in that acceleration is also monitored in addition to the position and the speed. Other configurations are the same as in the first embodiment described above. Accordingly, their detailed descriptions are not repeated here.

Figure 6:
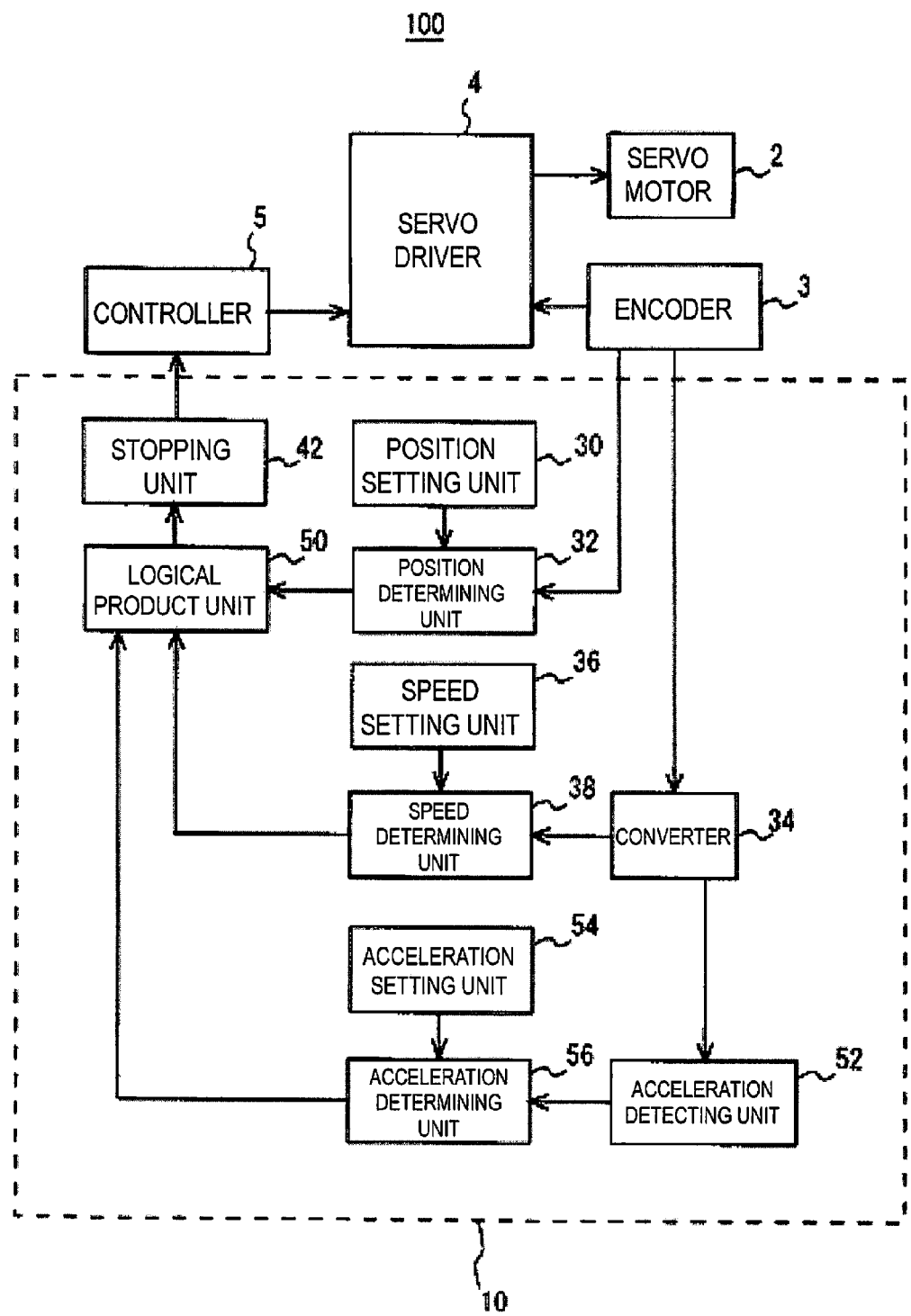
FIG. 6 is a functional block diagram of a safety unit according to a third embodiment.

Referring to FIG. 6, a configuration of a safety unit 10 according to the present embodiment is described. The same configurations as in the first embodiment described above are given like reference numerals and their detailed descriptions are not repeated here.

Safety unit 10 further includes acceleration detecting unit 52, acceleration setting unit 54, and acceleration determining unit 56. Acceleration detecting unit 52 detects acceleration of the power body, based on speed data from converter 34. That is, the acceleration is obtained by differentiating the speed data from converter 34.

Acceleration setting unit 54 sets in advance the safety range and the limiting range with regard to acceleration of the power body. As one example, the range with regard to the acceleration of the power body is set, based on the user's operation. The safety range and the limiting range are prescribed in the form of a table and the table is stored in safety unit 10.

Acceleration determining unit 56 determines whether the acceleration of the power body falls within the safety range or within the limiting range in which the safety range and the limiting range are determined in advance by acceleration setting unit 54. When the condition is met in which the acceleration of the power body has to fall within the predetermined limiting range, acceleration determining unit 56 outputs a motor stop command to logical product unit 50.

According to the present embodiment, logical product unit 50 obtains a logical product that derives from acceleration determining unit 56, in addition to deriving from position determining unit 32 and speed determining unit 38. Accordingly, logical product unit 50 outputs a command for stopping servo motor 2 to stopping unit 42, only in a case where it receives the motor stop command from all of position determining unit 32, speed determining unit 38, and acceleration determining unit 56.

Therefore, according to the present embodiment, servo motor 2, which is the power source, is stopped, only in a case where all of the condition in which the position of the power body (for example, the position of the robot arm) has to fall within the predetermined limiting range, the condition in which the speed of the power body (for example, the speed of the robot arm) has to fall within the predetermined limiting range, and the condition in which the acceleration of the power body (for example, the acceleration of the robot arm) has to fall within the predetermined limiting range are met at the same time.

In addition, logical product unit 50 may obtain a logical product that derives from at least two of position determining unit 32, speed determining unit 38 and acceleration determining unit 56. That is, servo motor 2, which is the power source, may be stopped, only in a case where at least two of the conditions in which the position of the power body (for example, the position of the robot arm) have to fall within the predetermined limiting range, the condition in which the speed of the power body (for example, the speed of the robot arm) has to fall within the predetermined limiting range, and the condition in which the acceleration of the power body (for example, the acceleration of the robot arm) has to fall within the predetermined limiting range are met at the same time.

Fourth Embodiment

A fourth embodiment is described below. The fourth embodiment differs from the first embodiment in that an amount of positional change is also monitored in addition to the position and the speed. Other configurations are the same as in the first embodiment described above. Accordingly, their detailed descriptions are not repeated here.

Figure 7:
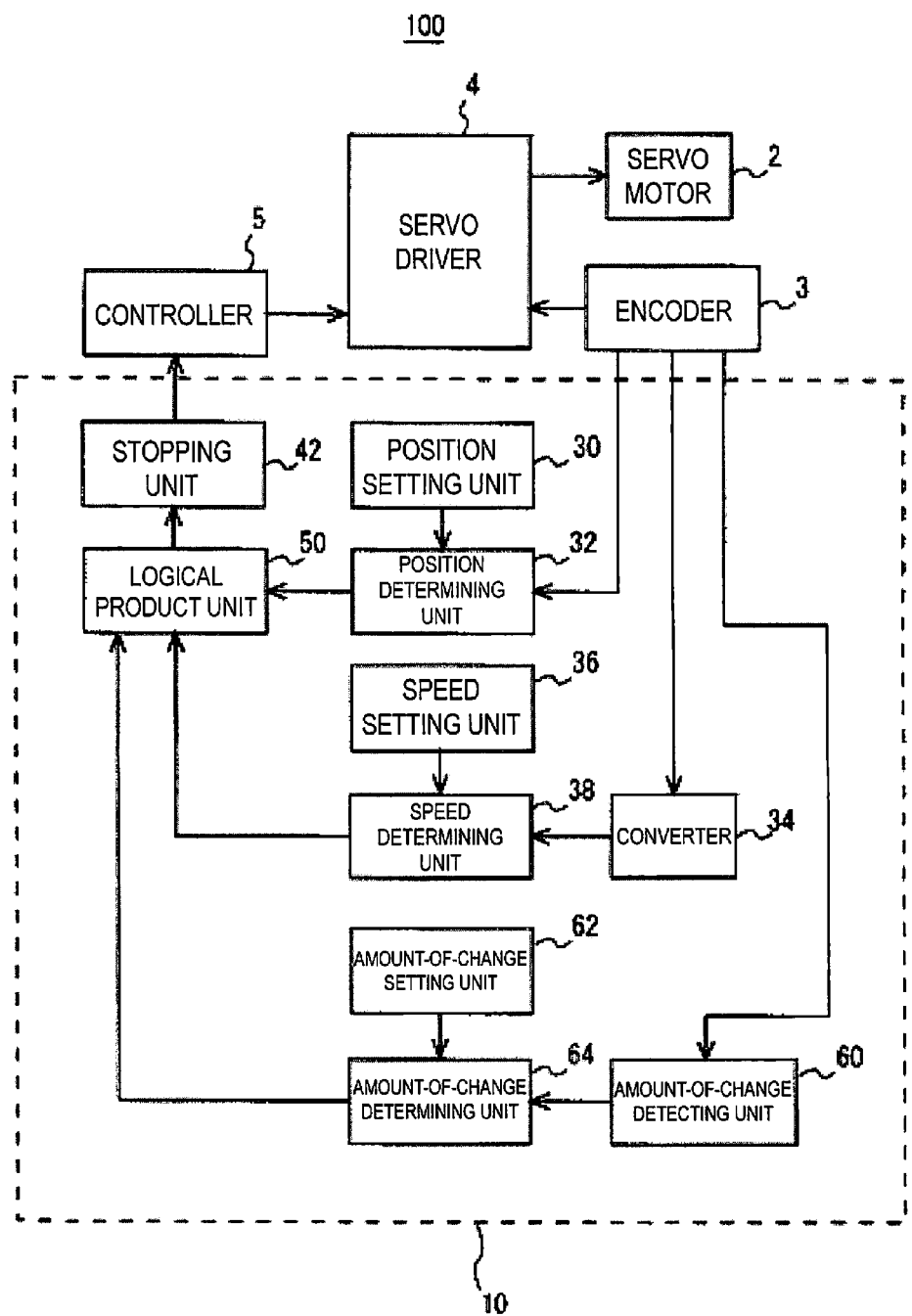
FIG. 7 is a functional block diagram of a safety unit according to a fourth embodiment.

Referring to FIG. 7, a configuration of a safety unit 10 according to the present embodiment is described. The same configurations as in the first embodiment described above are given like reference numerals and their detailed descriptions are not repeated here.

Safety unit 10 further includes amount-of-change detecting unit 60, amount-of-change setting unit 62, and amount-of-change determining unit 64. Amount-of-change detecting unit 60 detects the amount of positional change of the power body, based on the positional data from encoder 3.

Amount-of-change setting unit 62 sets in advance the safety range and the limiting range with regard to the amount of positional change of the power body. As an example, the range with regard to the amount of positional change of the power body is set, based on the user's operation. The safety range and the limiting range are prescribed in the form of a table and the table is stored in safety unit 10.

Amount-of-change determining unit 64 determines whether the amount of positional change of the power body falls within the safety range or within the limiting range in which the safety range and the limiting range are determined by amount-of-change setting unit 62. When the condition is met in which the amount of positional change of the power body has to fall within the predetermined limiting range, amount-of-change determining unit 64 outputs the motor stop command to logical product unit 50.

According to the fourth embodiment, logical product unit 50 obtains a logical product that derives from amount-of-change determining unit 64, in addition to deriving from position determining unit 32 and speed determining unit 38. Accordingly, logical product unit 50 outputs the command for stopping servo motor 2 to stopping unit 42, only in a case where it receives the motor stop command from all of position determining unit 32, speed determining unit 38, and amount-of-change determining unit 64.

Therefore, according to the present embodiment, servo motor 2, which is the power source, is stopped, only in a case where all of the condition in which the position of the power body (for example, the position of the robot arm) has to fall within the predetermined limiting range, the condition in which the speed of the power body (for example, the speed of the robot arm) has to fall within the predetermined limiting range, and the condition in which the amount of positional change of the power body (for example, the amount of positional change of the robot arm) has to fall within the predetermined limiting range are met at the same time.

In addition, logical product unit 50 may obtain the logical product that derives from at least two of position determining unit 32, speed determining unit 38 and amount-of-change determining unit 64. That is, servo motor 2, which is the power source, may be stopped, only in a case where at least two of the condition in which the position of the power body (for example, the position of the robot arm) has to fall within the predetermined limiting range, the condition in which the speed of the power body (for example, the speed of the robot arm) has to fall within the predetermined limiting range, and the condition in which the amount of positional change of the power body (for example, the amount of positional change of the robot arm) has to be the predetermined limiting direction are met at the same time.

Fifth Embodiment

A fifth embodiment is described below. The fifth embodiment differs from the first embodiment in that torque is also monitored in addition to the position and the speed. Other configurations are the same in the first embodiment described above. Accordingly, their detailed descriptions are not repeated here.

Figure 8:
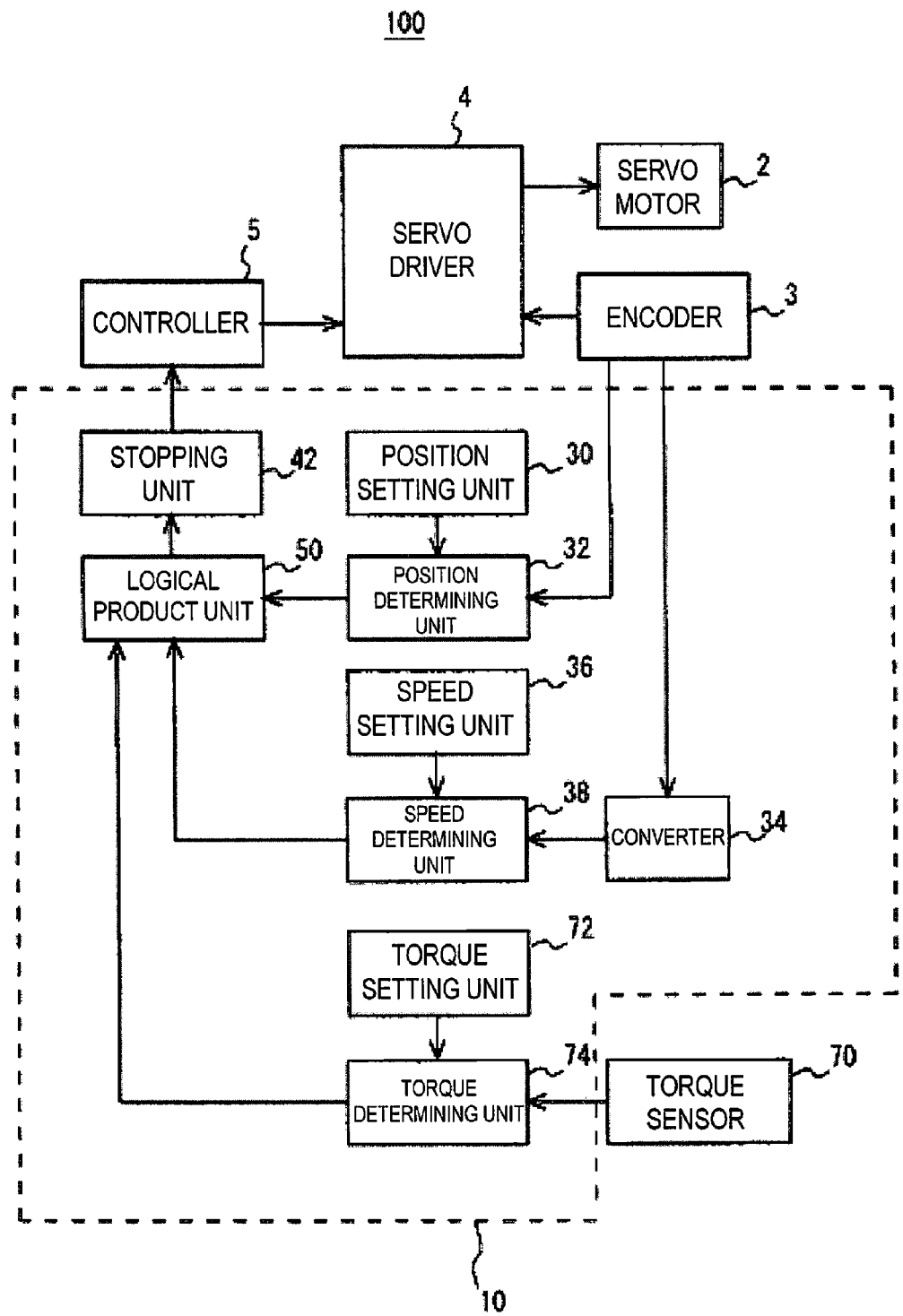
FIG. 8 is a functional block diagram of a safety unit according to a fifth embodiment.

Referring to FIG. 8, a configuration of a safety unit 10 according to the present embodiment is described. The same configurations as in the first embodiment described above are given like reference numerals and their detailed descriptions are not repeated here.

Servo system 100 further includes torque sensor 70. Safety unit 10 further includes torque setting unit 72 and torque determining unit 74. Torque sensor 70 detects torque of servo motor 2, or detects directly torque of the power body by being attached to the power body.

Torque setting unit 72 sets in advance the safety range and the limiting range with regard to the torque of servo motor 2 or the torque of the power body. As an example, the range with regard to the torque of servo motor 2 or the torque of the power body is set, based on the user's operation. The safety range and the limiting range are prescribed in the form of a table, and the table is stored in safety unit 10.

Torque determining unit 74 determines whether or not the torque of servo motor 2 or the torque of the power body falls within the safety range or within the limiting range in which the safety range and the limiting range are determined by torque setting unit 72. When the condition is met in which the torque of servo motor 2 or the torque of the power body has to fall within the predetermined limiting range, torque determining unit 74 outputs the motor stop command to logical product unit 50.

According to the fifth embodiment, logical product unit 50 obtains a logical product that derives from torque determining unit 74, in addition to deriving from position determining unit 32 and speed determining unit 38. Accordingly, logical product unit 50 outputs the command for stopping servo motor 2 to stopping unit 42, only in a case where it receives the motor stop command from all of position determining unit 32, speed determining unit 38, and torque determining unit 74.

Accordingly, according to the present embodiment, servo motor 2, which is the power source, is stopped, only in a case where all of the condition in which the position of the power body (for example, the position of the robot arm) has to fall within the predetermined limiting range, the condition in which the speed of the power body (for example, the speed of the robot arm) has to fall within the predetermined limiting range, and the condition in which the torque of servo motor 2 or the power body (for example, the torque of the robot arm) has to fall within the predetermined limiting range are met at the same time.

In addition, logical product unit 50 may obtain a logical product that derives from at least two of position determining unit 32, speed determining unit 38, and torque determining unit 74. That is, servo motor 2, which is the power source, may be stopped, only in a case where at least two of the conditions in which the position of the power body (for example, the position of the robot arm) have to fall within the predetermined limiting range, the condition in which the speed of the power body (for example, the speed of the robot arm) has to fall within the predetermined limiting range, and the condition in which the torque of servo motor 2 or the torque of the power body (for example, the torque of the robot arm) has to fall within the predetermined limiting range are met at the same time.

Furthermore, without using torque sensor 70, input to torque determining unit 74 can be made by detecting the torque of servo motor 2. Accordingly, data of the torque occurring in servo motor 2, detected by servo driver 4, may be used.

Sixth Embodiment

A sixth embodiment is described below. The sixth embodiment differs from the first embodiment in that a temperature is also monitored in addition to the position and the speed. Other configurations are the same as in the first embodiment described above. Accordingly, their detailed descriptions are not repeated here.

Figure 9:
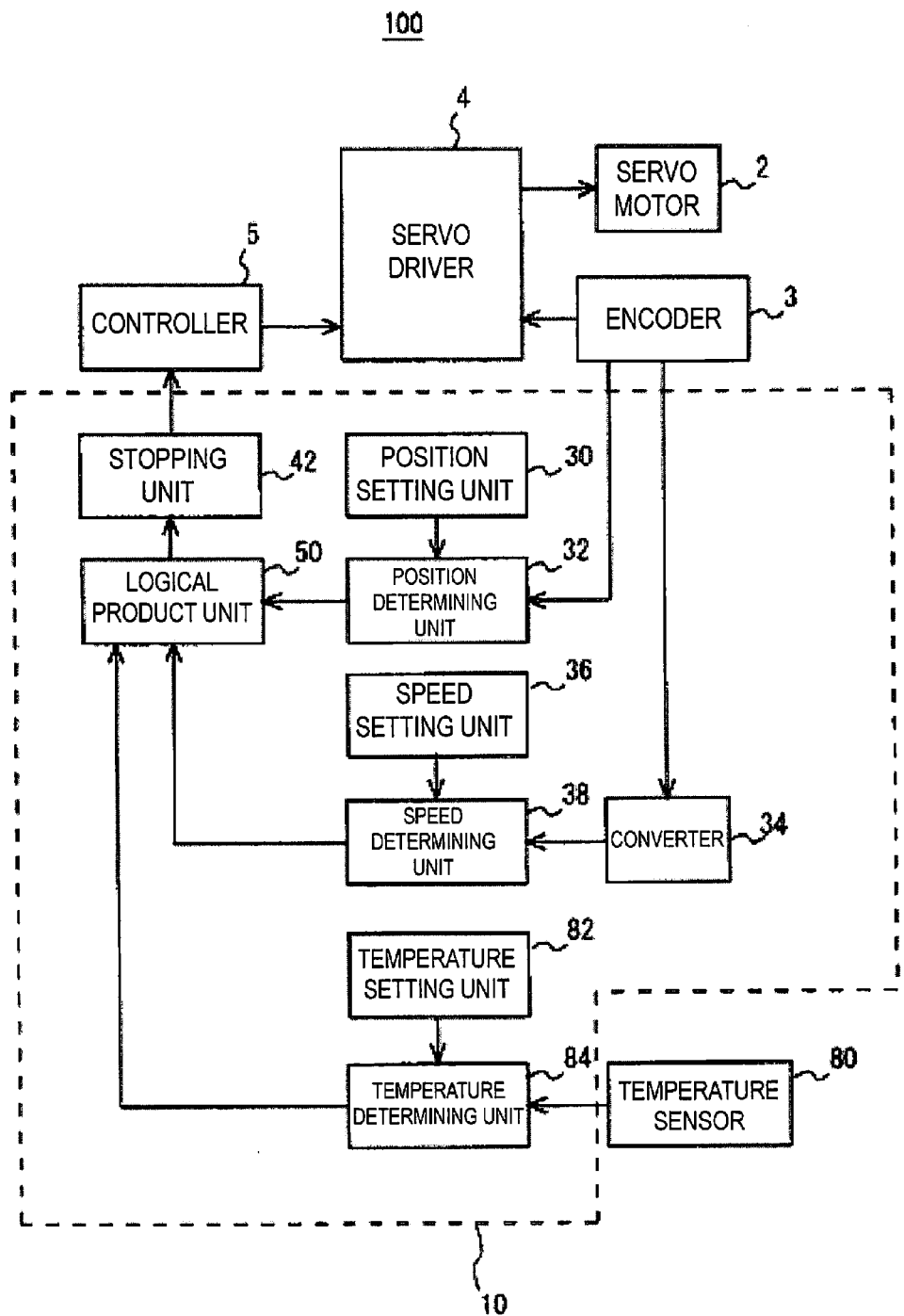
FIG. 9 is a functional block diagram of a safety unit according to a sixth embodiment.

Referring to FIG. 9, a configuration of safety unit 10 according to the present embodiment is described. The same configurations as in the first embodiment described above are given like reference numerals and their detailed descriptions are not repeated here.

Servo system 100 further includes a temperature sensor 80. Safety unit 10 further includes temperature setting unit 82 and temperature determining unit 84. The temperature sensor 80 detects a temperature of servo motor 2.

Temperature setting unit 82 sets in advance the safety range and the limiting range with regard to the temperature of servo motor 2. As one example, the safety range and the limiting range with regard to the temperature of servo motor 2 are set, based on the user's operation. The safety range and the limiting range are prescribed in the form of a table, and the table is stored in safety unit 10.

Temperature determining unit 84 determines whether the temperature of servo motor 2 falls within the safety range or within the limiting range in which the safety range and the limiting range are determined by temperature setting unit 82. When the condition is met in which the temperature of servo motor 2 has to fall within the predetermined limiting range, temperature determining unit 84 outputs the motor stop command to logical product unit 50.

Moreover, according to the present embodiment, the temperature of an arbitrary portion of the power body (for example, the industrial robot arm) is detected and whether the temperature of the arm, which is a power body, falls within the safety range, or within the limiting range may be determined, instead of determining whether the temperature of servo motor 2 falls within the predetermined safety range or within the limiting range.

According to the present embodiment, logical product unit 50 obtains a logical product that derives from temperature determining unit 84, in addition to deriving from position determining unit 32 and speed determining unit 38. Accordingly, logical product unit 50 outputs the command for stopping servo motor 2 to stopping unit 42, only in a case where it receives the motor stop command from all of position determining unit 32, speed determining unit 38, and temperature determining unit 84.

Therefore, according to the present embodiment, servo motor 2, which is the power source, is stopped, only in a case where all of the condition in which the position of the power body (for example, the position of the robot arm) has to fall within the predetermined limiting range, the condition in which the speed of the power body (for example, the speed of the robot arm) has to fall within the predetermined limiting range, and the condition in which the temperature of servo motor 2 (or the temperature of the power body, for example, the temperature of the robot arm) has to fall within the predetermined limiting range are met at the same time.

In addition, logical product unit 50 may obtain a logical product that derives from at least two of position determining unit 32, speed determining unit 38 and temperature determining unit 84. That is, servo motor 2, which is the power source, may be stopped, only in a case where at least two of the condition in which the position of the power body (for example, the position of the robot arm) has to fall within the predetermined limiting range, the condition in which the speed of the power body (for example, the speed of the robot arm) has to fall within the predetermined limiting range, and the condition in which the temperature of servo motor 2 (or the temperature of the power body, for example, the temperature of the robot arm) has to fall within the predetermined limiting range are met at the same time.

Furthermore, the first to sixth embodiments may be arbitrarily combined with each other. That is, at least two physical parameters selected from among the position, the speed, the motion direction, the acceleration, the amount of positional change, the torque, and the temperature are detected, and servo motor 2 may be stopped only in a case where the detected physical parameters individually meet the predetermined conditions for the corresponding physical parameters.

Seventh Embodiment

A seventh embodiment is described below. The seventh embodiment differs from the first embodiment described above, in that the positions of the power body are monitored with amounts of rotation of two servo motors and operations of both of the two servo motors are limited only in a case where the positions meet their respective predetermined conditions. Since other configurations are the same, or approximately the same as in the first embodiment described above, their detailed descriptions are not repeated here. Furthermore, the same configurations as in the first embodiment described above are given like reference numerals and their detailed descriptions are not repeated here.

Figure 10:
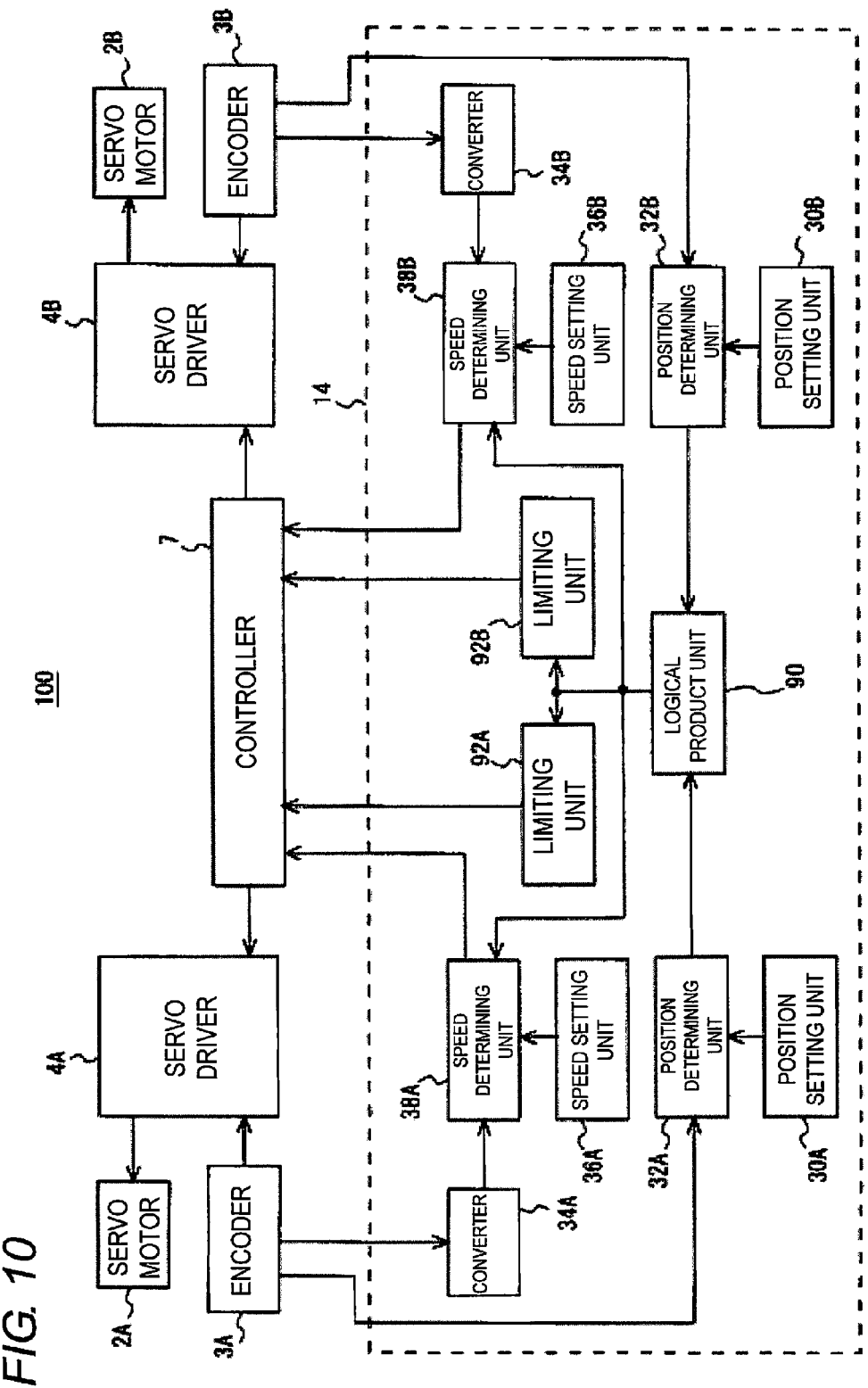
FIG. 10 is a functional block diagram of a safety unit according to a seventh embodiment.

Referring to FIG. 10, according to the present embodiment, servo system 100 includes two servo motors 2A and 2B, two encoders 3A and 3B, two servo drivers 4A and 4B, controller 7, and safety unit 14.

Servo motor 2A, for example, is a servo motor for moving a gantry robot arm in the X-axis direction, and servo motor 2B is a servo motor for moving the arm in the Y-axis direction. Each configuration of two servo motors 2A and 2B is the same, or approximately the same as that in servo motor 2 in the first embodiment described above. Similarly, each configuration of the two encoders 3A and 3B is the same, or approximately the same as that in encoder 3. Each configuration of the two servo drivers 4A and 4B is the same, or approximately the same as the configuration of servo driver 4. The configuration of controller 7 is the same or approximately the same as the configuration of controller 5. Accordingly, their detailed descriptions are not repeated here.

Safety unit 14 differs from safety unit 10 described in the first embodiment, in that safety unit 14 is configured to monitor amounts of rotation of encoders 3A and 3B that are connected to the shafts of two servo motors 2A and 2B driving an object in motion, respectively, in a manner that encoders 3A and 3B are linked directly or mechanically to move, in order to monitor a position of the object in motion.

Safety unit 14 includes position setting units 30A and 30B, position determining units 32A and 32B, converters 34A and 34B, speed setting units 36A and 36B, speed determining units 38A and 38B, logical product unit 90, and limiting units 92A and 92B.

Position setting unit 30A sets in advance the safety range and the limiting range with regard to the amount of rotation of encoder 3A. As an example, the range with regard to the amount of rotation of encoder 3A is set, based on the user's operation.

Similarly, position setting unit 30B sets in advance the safety range and the limiting range with regard to the amount of rotation of encoder 3B. As an example, the range with regard to the amount of rotation of encoder 3B is set, based on the user's operation.

The safety range and the limiting range are prescribed in the form of a table, and the table is stored in safety unit 10.

Position determining unit 32A determines whether the amount of rotation of encoder 3A falls within the safety range or within the limiting range in which the safety range and the limiting range are determined by position setting unit 30A. When the condition is met in which the amount of rotation of encoder 3A has to fall within the limiting range determined by position setting unit 30A, position determining unit 32A outputs a limiting command for limiting operations of servo motors 2A and 2B to logical product unit 90.

Similarly, position determining unit 32B determines whether the amount of rotation of encoder 3B falls within the safety range or within the limiting range in which the safety range and the limiting range are determined by position setting unit 30B. When the condition is met in which the amount of rotation of encoder 3B has to fall within the limiting range determined by position setting unit 30B, position determining unit 32B outputs the limiting command for limiting operations of servo motors 2A and 2B to logical product unit 90.

Logical product unit 90 obtains a logical product that derives from both of position determining unit 32A and position determining unit 32B. Accordingly, logical product unit 90 outputs the limiting command for limiting the operation of the servo motor to each of limiting units 92A and 92B, only in a case where it receives the motor stop commands from both of position determining unit 32A and position determining unit 32B. The limiting command is input to speed determining units 38A and 38B as well.

Therefore, the limiting command is output from logical product unit 90, only in a case where the condition in which the amount of rotation of encoder 3A has to fall within the predetermined range, and the condition in which the amount of rotation of encoder 3B has to fall within the predetermined range are met at the same time.

Limiting unit 92A receives the limiting command from logical product unit 90 and limits the operation of servo motor 2A. According to the present embodiment, the command for limiting the rotation speed of a rotation shaft of servo motor 2A to the predetermined range is issued to controller 7. Controller 7 adjusts the rotation speed in such a manner that the rotation speed of the rotation shaft of servo motor 2A falls within the predetermined range. Accordingly, when the rotation speed is out of the predetermined range at the time that the limiting command is input from logical product unit 90 to limiting unit 92A, the rotation speed is increased or decreased until the rotation speed reaches a value within the predetermined range. According to the present embodiment, the range limiting the rotation speed is the same, or approximately the same as the range determined by speed setting unit 36A.

Similarly, limiting unit 92B receives the limiting command from logical product unit 90 and limits the operation of servo motor 2B. According to the present embodiment, the command for limiting the rotation speed of a rotation shaft of servo motor 2B to the predetermined range is issued to controller 7. Controller 7 adjusts the rotation speed in such a manner that the rotation speed of the rotation shaft of servo motor 2B falls within the predetermined range. Accordingly, when the rotation speed is out of the predetermined range at the time that the limiting command is input from logical product unit 90 to limiting unit 92B, the rotation speed is increased or decreased until the rotation speed reaches a value within the predetermined range. According to the present embodiment, the range that limits the rotation speed is the same, or approximately the same as the range determined by speed setting unit 36B.

Converter 34A computes the rotation speed (an angular speed) of the rotation shaft of servo motor 2A, for example, by differentiating the amount of rotation of encoder 3A. Similarly, converter 34B computes the rotation speed (an angular speed) of the rotation shaft of servo motor 2B, for example, by differentiating the amount of rotation of encoder 3B.

Speed setting unit 36A sets in advance the range with regard to the rotation speed of the rotation shaft of servo motor 2A. As an example, the range with regard to the rotation speed of the rotation shaft of servo motor 2A is set, based on the user's operation.

Similarly, speed setting unit 36B sets in advance the range with regard to the rotation speed of the rotation shaft of servo motor 2B. As an example, the range with regard to the rotation speed of the rotation shaft of servo motor 2B is set, based on the user's operation.

Speed determining unit 38A determines whether the rotation speed of the rotation shaft of servo motor 2A is out of the range determined by speed setting unit 36A, in a case where the limiting command is output from logical product unit 90. When the condition is met in which the rotation speed of the rotation shaft of servo motor 2A has to be out of the range determined by speed setting unit 36A, speed determining unit 38A outputs a command for stopping servo motor 2A to controller 7. When receiving the command for stopping servo motor 2A from speed determining unit 38A, controller 7 stops servo motor 2A.

Similarly, speed determining unit 38B determines whether the rotation speed of the rotation shaft of servo motor 2B is out of the range determined by speed setting unit 36B, in a case where the limiting command is output from logical product unit 90. When the condition is met in which the rotation speed of the rotation shaft of servo motor 2B has to be out of the range determined by speed setting unit 36B, speed determining unit 38B outputs a command for stopping servo motor 2B to controller 7. When receiving the command for stopping servo motor 2B from speed determining unit 38B, controller 7 stops servo motor 2B.

According to the present embodiment, since in a case where the limiting command is output from logical product unit 90, the rotation speed is adjusted in such a manner that the rotation speeds of the rotation shafts of servo motors 2A and 2B fall within the predetermined ranges and the rotation speeds of the rotation shafts of servo motors 2A and 2B are monitored, as a result of this, servo motors 2A and 2B are stopped when the rotation speed of the rotation shaft of servo motors 2A and 2B are out of the predetermined ranges.

As described above, according to the present embodiment, when all of the amounts of rotation of encoders 3A and 3B that detects the amount of rotation of the rotation shaft of servo motor 2A and 2B fall within the predetermined limiting ranges that are determined, respectively, the rotation speeds of the rotation shafts of servo motors 2A and 2B are limited. On the other hand, when the amount of rotation of the rotation shaft of servo motor 2B is out of the limiting range even though the amount of rotation of the rotation shaft of servo motor 2A, for example, falls within the limiting range, the rotation speeds of the rotation shafts of servo motors 2A and 2B may not be limited. Because of this, limiting regions of servo motors 2A and 2B, for example, may be set as the regions indicated by slash lines in FIG. 11.

Figure 11:
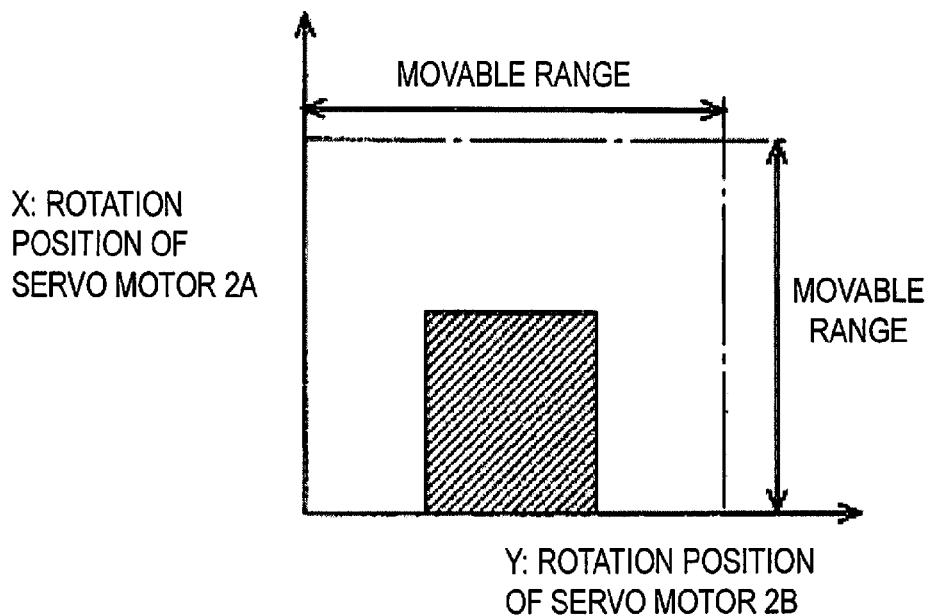
FIG. 11 is a diagram illustrating a region where operation of a servo motor is limited according to the seventh embodiment.
Figure 12:
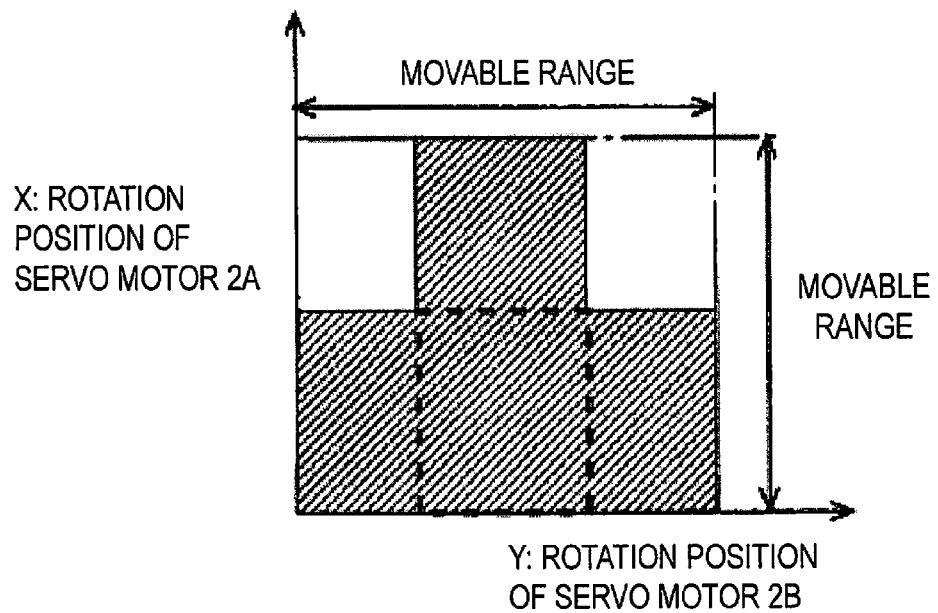
FIG. 12 is a diagram illustrating a region where the operation of the servo motor is limited in an example in which the operation of the servo motor is limited, when a rotation position of a rotation shaft of any one of the two servo motors falls within a predetermined range.

Here, in a case when any one of the rotation position of the rotation shaft of servo motor 2A and the rotation position of the rotation shaft of the servo motors 2B falls within the limiting range, the rotation speeds of the rotation shafts of servo motors 2A and 2B are supposed to be limited, the rotation speed limiting regions, indicated by the slant lines in FIG. 12, are expanded, compared to the region (indicated by the dashed line in FIG. 12) illustrated in FIG. 11. However, according to the present embodiment, the limits to the operations of servo motors 2A and 2B may be canceled also in the expanded limiting region in FIG. 12. Therefore, the limitation to the operations of servo motors 2A and 2B in various regions may be canceled.

Moreover, according to the present embodiment, a rotation direction may be limited instead of, or in addition to the rotation speed of each of the rotation shafts of servo motors 2A and 2B. That is, instead of, or in addition to the rotation speed of each of the rotation shafts of servo motors 2A and 2B, the rotation direction may be limited to a predetermined direction. Therefore, when the rotation direction differs from the predetermined direction after the rotation direction is limited, servo motors 2A and 2B may be stopped.

Alternatively, according to the present embodiment, rotation acceleration may be limited instead of, or in addition to the rotation speed of each of the rotation shafts of servo motors 2A and 2B. That is, instead of or in addition to the rotation speed of each of the rotation shafts of servo motors 2A and 2B, the rotation acceleration may be limited to a predetermined range. Therefore, when the rotation acceleration is out of the predetermined range after the rotation acceleration is limited, servo motors 2A and 2B may be stopped.

Furthermore, according to the present embodiment, the example in which the gantry robot arm is operated in the X-axis direction and in the Y-axis direction is basically assumed. Accordingly, the illustration shows the example in which the number of each of the servo motor, the encoder, the servo driver, the converter, the speed setting unit, the speed determining unit, the position setting unit, the position determining unit, and the limiting unit is two, but the same operations may be performed also with regard to the Z-axis, the θ-axis, and/or the like. When appropriate, three or more of the above-mentioned components may be provided.

Eighth Embodiment

An eighth embodiment of the present invention is described below. The present embodiment differs from the seventh embodiment described above in that the rotation position of the rotation shaft of servo motor 2A and the rotation position of the rotation shaft of servo motor 2B are monitored mutually relatedly, not individually. Since other configurations are the same, or approximately the same as in the seventh embodiment described above, their detailed descriptions are not repeated here. Furthermore, the same configurations as in the seventh embodiment described above are given like reference numerals and their detailed descriptions are not repeated here.

Figure 13:
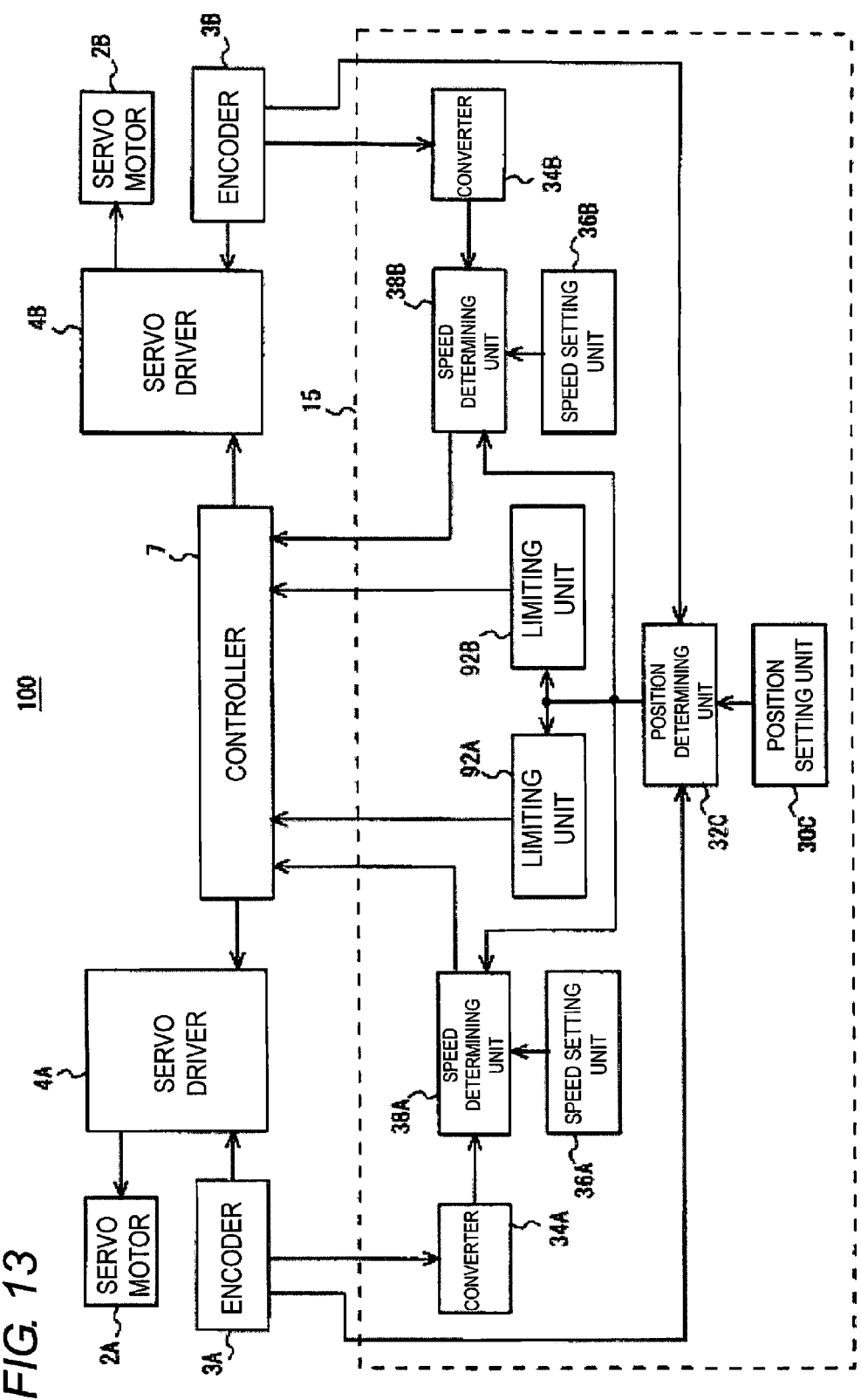
FIG. 13 is a functional block diagram for describing a configuration of a safety unit according to an eighth embodiment.

Referring to FIG. 13, according to the present embodiment, a safety unit 15 includes a position setting unit 30C and a position determining unit 32C. Position setting unit 30C sets in advance the safety range and the limiting range of a combination of the amount of rotation of encoder 3A indicating the rotation position of the rotation shaft of servo motor 2A and the amount of rotation of encoder 3B indicating the rotation position of the rotation shaft of servo motor 2B. As an example, the ranges with regard to the rotation positions of the rotation shafts of servo motors 2A and 2B are set, based on the user's operation. The safety range and the limiting range are prescribed in the form of a table, and the table is stored in safety unit 10.

Figure 14:
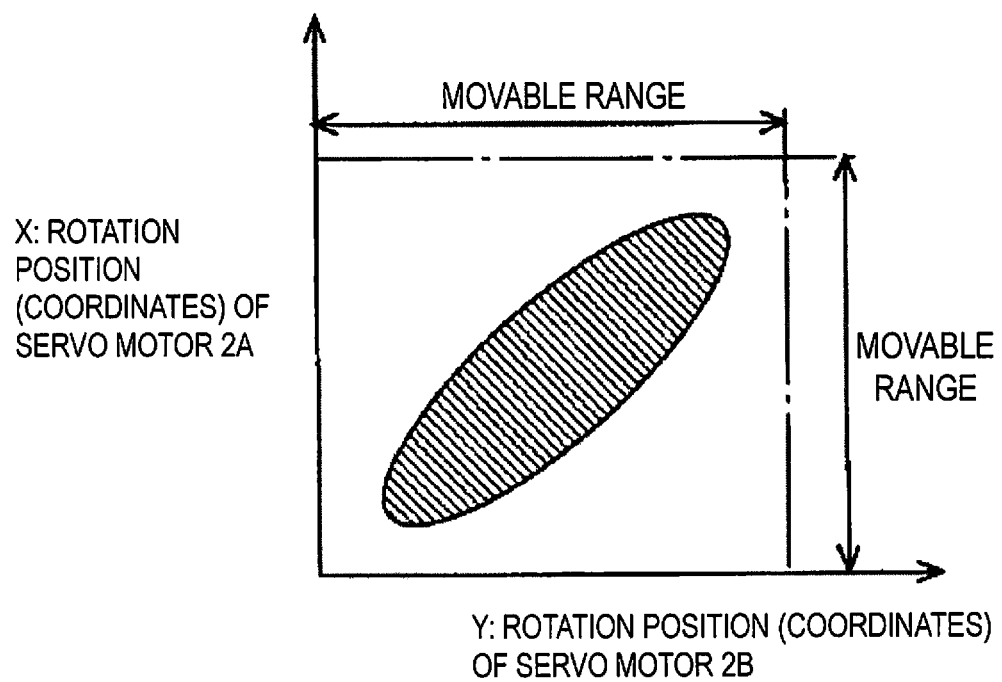
FIG. 14 is a diagram illustrating a region where the operation of the servo motor is limited according to the eighth embodiment.

FIG. 14 illustrates an example of the position range, to which the operation of the servo motor is limited according to the present embodiment. The region indicated by the slant lines in FIG. 14 is set as the limiting range of the rotation position, which limits the rotation speeds, the rotation acceleration, or the rotation directions of the rotation shafts of servo motors 2A and 2B. Other regions are set as the safety range. At this point, setting of the limiting range, to which the operation of the servo motor is limited, is not determined only by the rotation position of the rotation shaft of each of the servo motors, but the limiting range is set for every coordinates of the rotation position of each of the rotation shafts of the two servo motors. For example, each coordinates (X, Y), where an X coordinate is the rotation position of servo motor 2A and a Y coordinate is the rotation position of servo motor 2B, is set as falling within one of the limiting range and the non-limiting range (the safety range). Therefore, according to the present embodiment, the limits to the operations of servo motors 2A and 2B may be set or canceled in the region that is determined more complicatedly than in the seventh embodiment.

Referring back to FIG. 13, position determining unit 32C determines whether the combination of the rotation position of the rotation shaft of servo motor 2A and the rotation position of the rotation shaft of servo motor 2B falls within the limiting range set by position setting unit 30C or within the non-limiting range (the safety range). When the condition is met in which the rotation position of the rotation shaft of servo motor 2A and the rotation position of the rotation shaft of servo motor 2B have to fall within the limiting range set by position setting unit 30C, position determining unit 32C outputs the limiting command for limiting the operations of servo motors 2A and 2B to each of limiting unit 92A and limiting unit 92B and at the same time outputs the limiting command for monitoring the speed to each of speed determining unit 38A and speed determining unit 38B.

In addition, as in the seventh embodiment, the rotation direction and/or the rotation acceleration may be limited instead of or in addition to the rotation speed of each of the rotation shafts of servo motors 2A and 2B. That is, instead of or in addition to the rotation speed of each of the rotation shafts of servo motors 2A and 2B, the rotation direction may be limited to the predetermined direction or the rotation acceleration may be limited to the predetermined range. Therefore, when the rotation direction differs from the predetermined direction, or the rotation acceleration is out of the predetermined range, after the rotation direction is limited, servo motors 2A and 2B may be stopped.

Furthermore, the present embodiment includes the condition wherein the number of each of the servo motor, the encoder, the servo driver, the converter, the speed setting unit, the speed determining unit and the limiting unit is two, but three or more of each of the above-mentioned components may be provided.

All embodiments described above are provided by way of examples in all respects and are not given any limitation. The scope of the invention is determined by the scope of the claims, not by what is described above, and is intended to include all modifications within the scope of the claims and the meanings and the scope of their equivalents.

What is claimed is:

1. An apparatus for controlling a power source comprising:
    a detecting unit that detects at least two physical parameters selected from physical parameters of a power body driven by the power source and from physical parameters of the power source, and a motion direction of the power body;
    a safety range setting unit that sets a first safety range of the at least two physical parameters and that independently sets a second safety range of the motion direction of the power body for preventing an operator from coming into contact with the power body;
    a limiting range setting unit that sets a first limiting range of the at least two physical parameters and that independently sets a second limiting range of the motion direction of the power body, the first limiting range and the second limiting range set independent of the first safety range and the second safety range, the first limiting range and the second limiting range being different from the first safety range and the second safety range;
    a determining unit that makes a first determination of whether any of the at least two physical parameters falls within the first safety range or within the first limiting range and that makes a second independent determination of whether the motion direction of the power body falls within the second safety range or within the second limiting range;
    a logical product unit that first receives the first determination from the determining unit, and independently receives the second determination from the determining unit and generates a logical product if both the first determination and the second determination indicate that the at least two physical parameters and the motion direction fall within the respective first and second limiting ranges, and
    a limiting unit that limits operation of the power source only when the generated logical product of both the first determination and the second determination indicate that the at least two detected physical parameters and the motion direction of the power body are within their respective first and second limiting ranges.

2. The apparatus for controlling a power source according to claim 1, wherein
    the at least two physical parameters comprise at least one of a position of the power body, a speed of the power body, an acceleration of the power body, and an amount of positional change of the power body, and
    the detecting unit detects the position of the power body and detects at least one of the speed of the power body; the acceleration of the power body; and the amount of positional change of the power body, from the position of the power body.

3. The apparatus for controlling a power source according to claim 1, wherein
    the at least two physical parameters comprise at least one of a position of the power body, a speed of the power body, an acceleration of the power body, and an amount of positional change of the power body; a torque of the power body; a temperature of the power body; a rotation angle of a drive shaft of the power source; a torque of the power source; and a temperature of the power source, and
    the detecting unit detects at least two of: the position of the power body; the speed of the power body; acceleration of the power body; the amount of positional change of the power body; the torque of the power body; the temperature of the power body; the rotation angle of a drive shaft of the power source; the torque of the power source; and the temperature of the power source.

4. The apparatus for controlling a power source according to claim 1, further comprising:
    a storage unit that stores a table in which the first safety range and the second safety range and the first limiting range and the second limiting range are stored.

5. The apparatus for controlling a power source according to claim 1, wherein the at least two detected physical parameters comprise at least one physical parameter associated with the power source and at least one physical parameter associated with the power body.

6. The apparatus for controlling a power source according to claim 5, further comprising a temperature sensor for detecting a temperature of the power source,
    wherein the at least one physical parameter associated with the power source comprises a temperature of the power source as obtained by the temperature sensor.

7. An apparatus for controlling a power source comprising:
    a detecting unit that detects physical parameters of at least two shafts of power bodies driven by at least two power sources, and motion directions of the power bodies;
    a safety range setting unit that sets a first safety range for the physical parameters and that independently sets a second safety range of the motion directions of the at least two shafts that prevent an operator from coming into contact with the power bodies;
    a limiting range setting unit that sets a first limiting range for the physical parameters and that independently sets a second limiting range of the motion directions of the at least two shafts, the first limiting range and the second limiting range set independent of the first safety range and the second safety range, the first limiting range and the second limiting being different from the first safety range and the second safety range;
    a determining unit that makes a first determination of whether the physical parameters fall within the first safety range or within the first limiting range and that makes a second determination of whether the motion directions of the at least two shafts fall within the respective second safety range or within the second limiting range;
    a logical product unit that first receives the first determination from the determining unit, and independently receives the second determination from the determining unit and generates a logical product if both the first determination and the second determination indicate that the physical parameters and the motion directions fall within the respective first and second limiting ranges; and a limiting unit that limits operations of the at least two power sources only when the generated logical product of both the first determination and the second determination indicate that the physical parameters and the motion directions of the at least two shafts fall within the respective first and second limiting ranges.

8. The apparatus for controlling a power source according to claim 7, further comprising:

a storage unit that stores a table in which the first safety range and the second safety range and the first limiting range and the second limiting range are stored.

9. The apparatus for controlling a power source according to claim 7, wherein the physical parameter of the power body is any one of position, speed, acceleration, amount of positional change, torque, and temperature.

10. The apparatus for controlling a power source according to claim 7, wherein the limiting unit limits a speed of the drive unit of the power source to a predetermined range.

11. The apparatus for controlling a power source according to claim 10 further comprising:

a stopping unit that stops the power source when the speed of the drive unit of the power source is outside of the predetermined range after the speed of the drive unit of the power source has been limited.

12. The apparatus for controlling a power source according to claim 7, wherein the limiting unit limits acceleration of the drive unit of the power source to a predetermined range.

13. The apparatus for controlling a power source according to claim 12 further comprising:

a stopping unit that stops the power source when acceleration of the drive unit of the power source is out of the predetermined range after limitation of acceleration of the power source drive unit.

14. The apparatus for controlling a power source according to claim 7, wherein the limiting unit limits the motion direction of the drive unit of the power source to a predetermined direction.

15. The apparatus for controlling a power source according to claim 14 further comprising:

a stopping unit that stops the power source when the motion direction of the drive unit of the power source is not the predetermined direction after the motion direction of the drive unit of the power source has been limited.

16. The apparatus for controlling a power source according to claim 7, further comprising a temperature sensor for detecting a temperature of the at least two shafts of power bodies, wherein one of the physical parameters of the at least two shafts utilized by the limiting unit comprises a temperature of the at least two shafts of power bodies as obtained by the temperature sensor.

17. An apparatus for controlling a power source comprising:

a detecting unit that detects physical parameters and rotation directions of at least two drive unit shafts of at least two power sources that drive power bodies;

a safety range setting unit that sets a first safety range of physical parameters and that independently sets a second safety range of the rotation directions of the respective at least two drive unit shafts preventing an operator from coming into contact with a power body;

a limiting range setting unit that sets first limiting ranges of the physical parameters and that independently sets second limiting ranges of the rotation directions of the respective at least two drive unit shafts, the first limiting range and the second limiting range set independent of the first safety range and the second safety range, the first limiting range and the second limiting being different from the first safety range and the second safety range;

a determining unit that makes a first determination of whether the physical parameters fall within the first safety range or within the first limiting range and that makes a second independent determination of whether the rotation directions of the at least two drive unit shafts fall within the second safety range or within the second limiting range;

a logical product unit that first receives the first determination from the determining unit, and independently receives the second determination from the determining unit and generates a logical product if both the first determination and the second determination indicate that the physical parameters and the rotation directions fall within the respective first and second limiting ranges; and a limiting unit that limits operations of the at least two power sources only when the generated logical product of both the first determination and the second determination indicate that a combination of at least two of the physical parameters and the rotation directions of the respective at least two drive unit shafts fall within the first and second limiting ranges.

18. The apparatus for controlling a power source according to claim 17, wherein the physical parameter of the power source is any one of rotation angle of a drive shaft, torque, and temperature.

19. The apparatus for controlling a power source according to claim 17, further comprising a temperature sensor for detecting a temperature of the at least two drive unit shafts, wherein one of the physical parameters of the at least two shafts utilized by the limiting unit comprises a temperature of the at least two drive unit shafts as obtained by the temperature sensor.

* * * * *